Dec. 6, 1966  JEAN PIERRE CAZALIS ET AL  3,289,698
DEVICE FOR PROVIDING A LEAK-TIGHT COUPLING
BETWEEN TWO SEALED ENCLOSURES
Filed Oct. 28, 1963

INVENTORS
JEAN PIERRE CAZALIS
GUY LEFORT
BY
Bacon & Thomas
ATTORNEYS 3,289,698
DEVICE FOR PROVIDING A LEAK-TIGHT COUPLING BETWEEN TWO SEALED ENCLOSURES
Jean Pierre Cazalis, Bezons, and Guy Lefort, Paris, France, assignors to Commissariat a l'Energie Atomique, Paris, France
Filed Oct. 28, 1963, Ser. No. 319,230
Claims priority, application France, Nov. 8, 1962, 914,840
1 Claim. (Cl. 137—614.01)

The present invention relates to a device which provides a leak-tight coupling between two sealed enclosures which can either be two cells or else one cell and a container, inside which are manipulated or stored either dangerous materials, in particular radioactive materials, or materials on which any contact with the outside atmosphere could produce a harmful effect.

The invention is more especially concerned among such devices with those which make it possible either to establish communication between two sealed enclosures or to separate said enclosures, also to permit these two operations to be carried out freely and with equal ease and to ensure that the imperviousness to the outer atmosphere of each enclosure or of the combined assembly formed by said sealed enclosures when connected together is not broken at any moment during the course of such operations, and that the contamination of certain surfaces by the products handled or by the outer atmosphere cannot pass through the seal.

Various solutions have hitherto been contemplated, especially in the nuclear energy industry, with a view to providing an answer to this problem. In particular, one expedient which has been adopted for the purpose of providing a coupling between sealed enclosures is the use of a joint constituted by a thin flexible tube of polyvinyl chloride and fitted over each enclosure by means of a sealing device. When it was required to separate the two enclosures, a high-frequency weld was effected at the center of the flexible tube. Thus the two enclosures could be separated by cutting the weld. In order to join the welds together again, the two remaining stubs were covered with a new flexible tube which was fixed in the same leak-tight manner over the two enclosures. The stubs could then be removed. This process frequently gave satisfactory results but failed when such joining and separating had to be carried out under a high degree of exposure to radiation or when the difference in pressure between the two enclosures and the outer atmosphere was too great. Similarly, when the atmospheres of the leakproof enclosures were different from the ambient atmosphere, it was necessary to purge the volume of the flexible tube prior to connecting it up with the cells.

Use has also been made of coupling devices with two doors, but these devices did not permit of disconnection without decontamination of the entire interior volume, and this was liable to give rise to considerable difficulties in the case of a high degree of radioactive contamination of the enclosures.

Finally, use has been made of an arrangement based on the principle mentioned above but in which the contaminated surface in contact with the non-contaminated atmosphere was reduced to a minimum. In this arrangement, the first enclosure was closed by a cover, the outer face of which was not contaminated. The second enclosure was also closed by a cover. When it was found necessary to join the two enclosures together, the initial operation accordingly consisted in simultaneously joining together in leakproof manner the external portions of the two enclosures as well as the two covers. When the said two covers had thus been joined together, they were lifted simultaneously, thus putting the two enclosures into communication; during this operation, the non-contaminated faces of the two covers which were thus applied against each other in leakproof manner were not contaminated. When it was found necessary to separate the two enclosures, the two covers were replaced together and the outer faces remained uncontaminated except for the very narrow zone corresponding to that which was liable to remain between the various bearing surfaces of the joint which did not always coincide in a precise manner. In this system, leak-tightness was ensured by the mechanical compression of joints, or sealing gaskets. The arrangement proved very satisfactory but nevertheless called for high precision in the design of the mechanisms employed for the purpose of effecting the closure of the covers, the coupling of said covers prior to opening and the mechanical centering of said covers. Furthermore, this arrangement also entailed the need to place said mechanisms within the enclosures. The result was that in the case of failure, any maintenance and/or repair work on said mechanisms often gave rise to difficult problems.

The primary object of the present invention is to endow the aforesaid devices with properties such that the various requirements which are encountered in practice can accordingly be complied with more effectively than has hitherto been possible, especially insofar as said devices permit the possibility of avoiding costly and complicated operations such as the purging of the atmosphere of certain volumes and the decontamination of certain surfaces.

The leak-tight coupling device in accordance with the invention mainly consists in that the two enclosures to be joined together are provided with two openings having the same dimensions and designed to be brought into oppositely facing relation, each of said openings being surrounded by a flange which is provided on the outer face of the corresponding enclosure and closed by a plug which is adapted to fit with a small clearance within said flange, the outer face of the flange of the first enclosure being provided with an open inner groove whilst the plug thereof is plain, the flange of the second enclosure being plain whilst the outer face of the plug thereof is provided with an open outer groove, each of said two grooves being designed to accommodate a gasket having a cross-section in the shape of a curvilineal polygon comprising at least four summits or lips, and each of the four bearing faces, namely two groove faces, one plug face and one flange face, which are formed by portions of surfaces of the three components which surround each gasket being in contact with at least one of the lips of said gasket.

A better understanding of the invention will in any case be gained from the complementary description which follows and from the accompanying drawings, it being understood that said complementary description and drawings are given solely by way of indication and not in any limiting sense.

Figure 1:
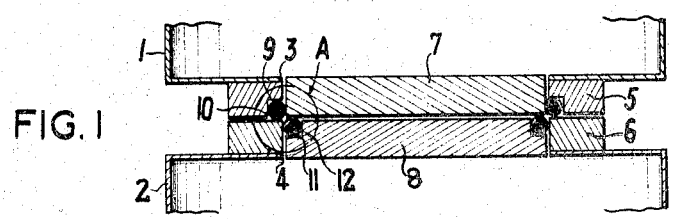
FIG. 1 is a sectional view of the combined assembly of the device in accordance with the invention.

As can be seen from FIG. 1, the object which is contemplated is to provide the possibility of either connecting or disconnecting at will two enclosures 1 and 2 in which are provided openings 3 and 4 having the same diameter which can be brought into oppositely facing relation. The opening 3 is surrounded by a flange 5 which is provided on the outer face of the enclosure 1. The opening 4 is also surrounded by a flange 6 which is provided on the outer face of the enclosure 2. A plug 7 can be adapted to close the opening 3 and a plug 8 to close the opening 4.

An open internal groove 9 is formed in the outer face of the flange 5 and is designed to accommodate a gasket 10. An open external groove 11 is formed in the outer face of the cover 8 and is designed to accommodate a gasket 12. The two gaskets 10 and 12 are therefore the only sealing devices which are provided between the four components 5, 6, 7 and 8 as considered in all possible combinations.

Figure 2:
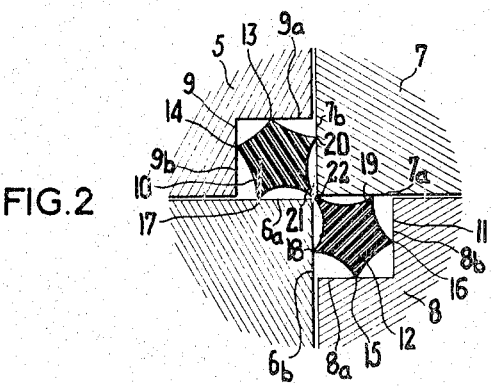
FIG. 2 is an enlarged sectional view of the detail A of FIG. 1.

In FIG. 2, the detail A of FIG. 1 has been shown on a larger scale, and the four components 5, 6, 7 and 8 are again shown together with the grooves 9 and 11 and the gaskets 10 and 12. As can be seen in this figure, the grooves 9 and 11 can advantageously have a square section while the gaskets 10 and 12 have a section in the shape of a curvilineal polygon comprising at least four summits or lips (five in the case which has been shown). The lips of the gaskets 10 and 12 bear on the different faces of the grooves 9 and 11 and on the components 6 and 7 which surround said grooves. According to the example which is illustrated, the faces 9a and 9b of the groove 9 each accommodate one lip, namely the lip 13 and the lip 14 respectively, of the gasket 10; similarly, the faces 8a and 8b of the groove 8 each accommodate one lip, namely the lip 15 and the lip 16 respectively, of the gasket 12; the face 6a of the flange 6 accommodates the lip 17 of the gasket 10 while the face 6b of said flange accommodates the lip 18 of the gasket 12; finally, the face 7a of the plug 7 accommodates the lip 19 of the gasket 12 while the face 7b of said plug accommodates the lip 20 of the gasket 10. In the example shown in the drawings, each gasket 10 and 12 is additionally provided with a fifth lip respectively designated by the reference numerals 21 and 22, said lips being adapted to come into contact with each other through the space which is formed between the flange 6 and the plug 7 as a result of the very small clearances existing between the four components 5, 6, 7 and 8. Accordingly, the contamination of the enclosure 1 is substantially prevented from passing through the lips 13 and 20 and in no event is it possible for any radioactive contamination to pass through the lips 14, 17 and 21 of the joint 10; similarly, the radioactive contamination of the enclosure 2 is substantially prevented from passing through the lips 15 and 18 and is prevented under all circumstances from passing through the lips 16, 19 and 22 of the gasket 12. The outer face of each plug 7 and 8 is therefore shielded from contamination by at least two lips located upstream.

Figure 3:
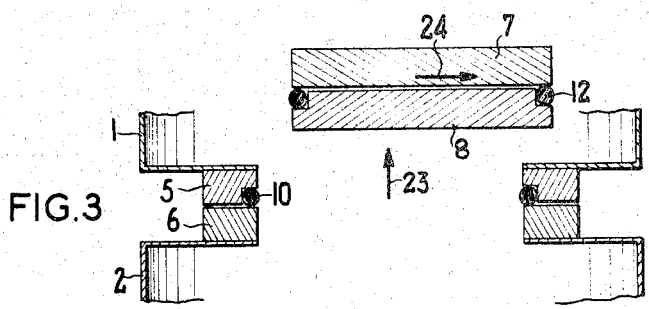
FIG. 3 is a sectional view of the device in accordance with the invention when connection is established between the two enclosures.

It will be apparent from FIG. 3 that, when it is desired to establish connection between the enclosures 1 and 2, it is merely necesary to remove by any suitable means, for example successively in the directions 23 and 24, the combined assembly which is formed by the plugs 7 and 8 and the gasket 12, the function of said gasket 12 being to prevent the contamination of the oppositely facing faces (namely the outer faces) of said plugs. It will thus become apparent that the gasket 10 which is compressed between the flanges 5 and 6 is sufficient to maintain leak-tightness between the space which is common to the two enclosures and the outer atmosphere.

Figure 4:
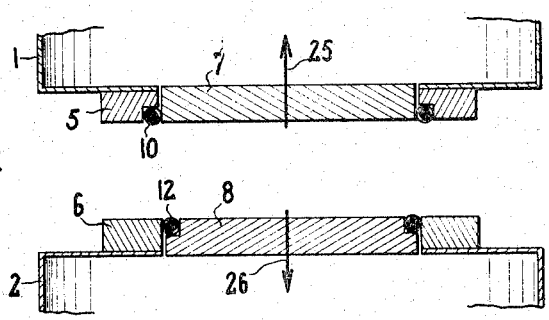
FIG. 4 is a sectional view of the device in accordance with the invention when the two enclosures are separated from each other.

It will be apparent from FIG. 4, that, when it is desired on the contrary to disconnect the enclosures 1 and 2, it is merely necessary to replace the two plugs 7 and 8 so that the plug 7 fits inside the flange 5, leak-tightness being ensured by the gasket 10, whilst the plug 8 is fitted inside the flange 6 and leak-tightness is accordingly ensured by the gasket 12. It is thus possible without any break in the seal to separate the enclosures 1 and 2 in the directions 25 and 26 as has been shown in the drawings.

The main advantage of the present invention clearly consists in the fact that two gaskets alone suffice to provide the various seals inasmuch as each gasket is capable of producing a triple action. A second important advantage lies in the fact that the non-contaminated surfaces of the plugs are practically equal in area to the areas of the openings inasmuch as the gaskets are only applied against the extreme edges of said openings and said plugs.

It will be understood that the invention is not limited in any sense to the constructional examples which have been described and illustrated or to the modes of application which have been contemplated therein but that, on the contrary, the invention is intended to include within its scope any and all alternative forms and especially devices for joining together a number of enclosures which may be more than two as well as different types of enclosures such as cells, lock-chambers, containers for transportation, storage and transfer.

What we claim is:

Device for providing a leak-tight coupling between two sealed enclosures, characterized in that said enclosures to be joined together are provided with two openings having the same dimensions and designed to be brought into oppositely facing relation, each of said openings being surrounded by a flange which is provided on the outer face of the corresponding enclosure and closed by a plug which is adapted to fit with a small clearance within said flange, the outer face of the flange of the first enclosure being provided with an open internal groove whilst the plug thereof is plain, the flange of the second enclosure being plain whilst the outer face of the plug thereof is provided with an open external groove, each of said two grooves being designed to accommodate a gasket having a cross-section in the shape of a curvilineal polygon comprising at least four summits or lips, and each of the four bearing faces, namely two groove faces, one plug face and one flange face, which are formed by portions of surfaces of the three components which surround each gasket being in contact with at least one of the lips of said gasket, at least one lip of one of said two gaskets being in contact with at least one lip of the other gasket.

No references cited.

ALAN COHAN, Primary Examiner.

HOWARD COHN, Assistant Examiner.